United States Patent [19]

Losey et al.

[11] 3,988,560

[45] Oct. 26, 1976

[54] METHOD AND APPARATUS FOR CONTROLLING GENERATION OF MACHINING PULSES IN EDM POWER SUPPLY

[75] Inventors: Jerry Earl Losey, Fort Thomas, Ky.; John Richard Witzel, Milford; Harry Dean Kauffman, Cincinnati, both of Ohio

[73] Assignee: Cincinnati Milacron, Inc., Cincinnati, Ohio

[22] Filed: Dec. 29, 1975

[21] Appl. No.: 645,255

[52] U.S. Cl. ............................ 219/69 C; 219/69 M; 219/69 P
[51] Int. Cl.² ........................................... B23P 1/08
[58] Field of Search ............. 219/69 C, 69 M, 69 P, 219/69 G; 235/151.11; 318/650

[56] References Cited
UNITED STATES PATENTS

| | | |
|---|---|---|
| 2,979,639 | 4/1961 | Williams et al..................... 219/69 P |
| 3,604,885 | 9/1971 | Inoue.................................. 219/69 P |
| 3,755,645 | 8/1973 | Kauffman........................... 219/69 C |
| 3,816,692 | 6/1974 | Ratmausky......................... 219/69 C |

*Primary Examiner*—Bruce A. Reynolds
*Attorney, Agent, or Firm*—C. Richard Eby

[57] ABSTRACT

In an EDM process, a method and apparatus are disclosed for determining the quality of a machining gap by detecting a voltage signal across the gap in response to a low power pulse applied immediately prior to a machining pulse. Upon detecting a first predetermined number of consecutive inferior gap voltage signals in response to corresponding low power pulses the application of low power pulses and machining pulses is terminated for a predetermined period of time. Thereafter, only the low power pulses are applied to the machining gap; and after detecting a second predetermined number of consecutive good gap voltage signals in response to corresponding low power pulses, the machining pulses are reapplied.

3 Claims, 5 Drawing Figures

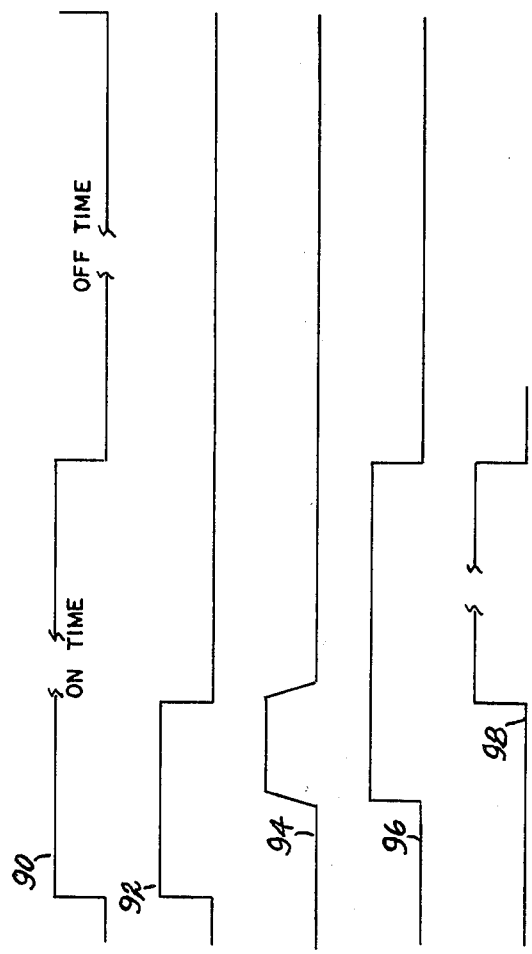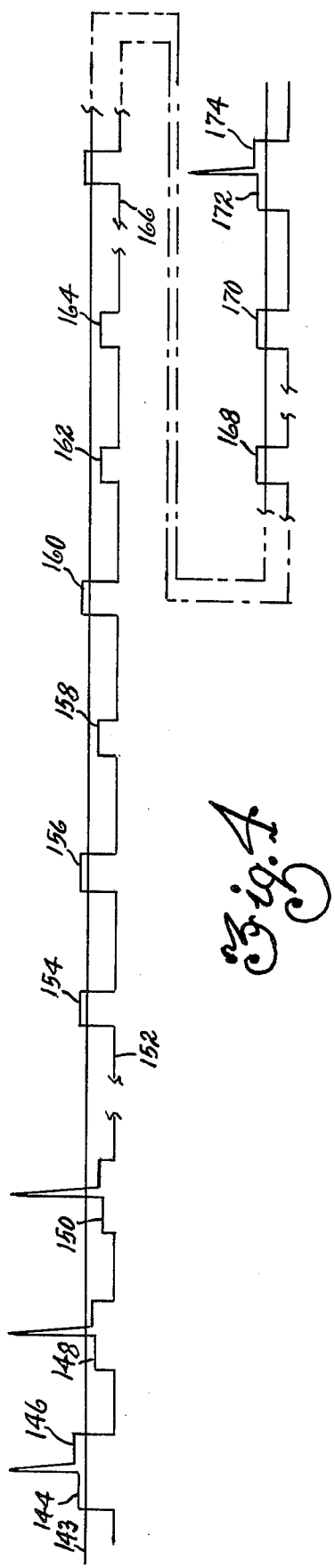

METHOD AND APPARATUS FOR CONTROLLING GENERATION OF MACHINING PULSES IN EDM POWER SUPPLY

BACKGROUND OF THE DISCLOSURE

The invention relates generally to the electrical discharge machining process. Specifically, the invention provides alternative cycles of operation of an EDM power supply in response to the detection of a unique control variable.

Typically, power supplies produce machining pulses which have variable ON times and OFF times. As disclosed in prior art, during the ON time, two discrete pulses may be applied to the machining gap. The first pulse is a low power pulse for creating a low power discharge. Immediately, following each low power pulse, a machining pulse is applied to the gap to generate a machining discharge thereby removing material from the workpiece. The low power pulse is used as a mechanism to supply information to control the subsequent operation of the power supply. This low power pulse should not be confused with a high voltage gap initiation circuit in which a separate high voltage signal is applied to the machining gap to ionize the gap thereby initiating a machining discharge. The main objective of the present disclosure is to apply a low power pulse to the machining gap prior to the application of the high voltage gap initiation signal and subsequent machining pulse. During the low power pulse, the voltage signal across the gap is detected to control the generation of subsequent machining pulses.

The prior art proposes that the current flowing through the gap during a low power discharge be measured. However, current as a measured variable has certain limitations. Because of the inherent stray capacitance in the system which must be charged by the low power pulse, the current signal contains an initial transient or overshoot which makes the detection of a stable discharge current very difficult. When working with very short ON times, the current does not have time to reach a stable state before the low power pulse is terminated. In this situation, the detection of current will provide unreliable information. To overcome this disadvantage, the present disclosure recites the detection of a gap voltage signal in response to low power pulses. The gap voltage signal does not contain a leading edge overshoot and provides similar information as to the general quality of the machining gap.

The present disclosure recites a mode of operation of the power supply in response to the detection of an inferior gap voltage signal produced by a low power pulse which is particularly useful where pitting of the workpiece is a problem.

SUMMARY OF THE INVENTION

According to one embodiment of the invention, an EDM power supply is claimed which is comprised in part of a source of clock pulses defining ON and OFF times. The power supply further includes power switching circuits which are connected to a DC source for producing during the ON times low power pulses and high power pulses across a machining gap. The low power pulses and high power pulses are generated in response to pilot pulses and machining pulses, respectively, which are generated within the power supply. The claimed improvement is comprised of means responsive to the clock pulses for generating the pilot pulses. Second, means are provided which are responsive to the pilot pulses for generating the machining pulses. Further, means are connected across the machining gap for detecting a voltage signal thereacross in response to the low power pulses, and a feedback signal is produced in response to said voltage signal being equal to or exceeding a predetermined magnitude. Finally, means are provided having inputs responsive to the clock pulses and the feedback signals and outputs connected to the generating means for controlling the generation of pilot pulses and machining pulses in response to the feedback signals.

BRIEF DESCRIPTION OF THE DRAWINGS

FIG. 3 is a synchrogram illustrating the timing of various signals within the power supply.

FIG. 4 illustrate the relationship between the discharges and the operation of the power supply.

DESCRIPTION OF THE PREFERRED EMBODIMENT

Figure 1:
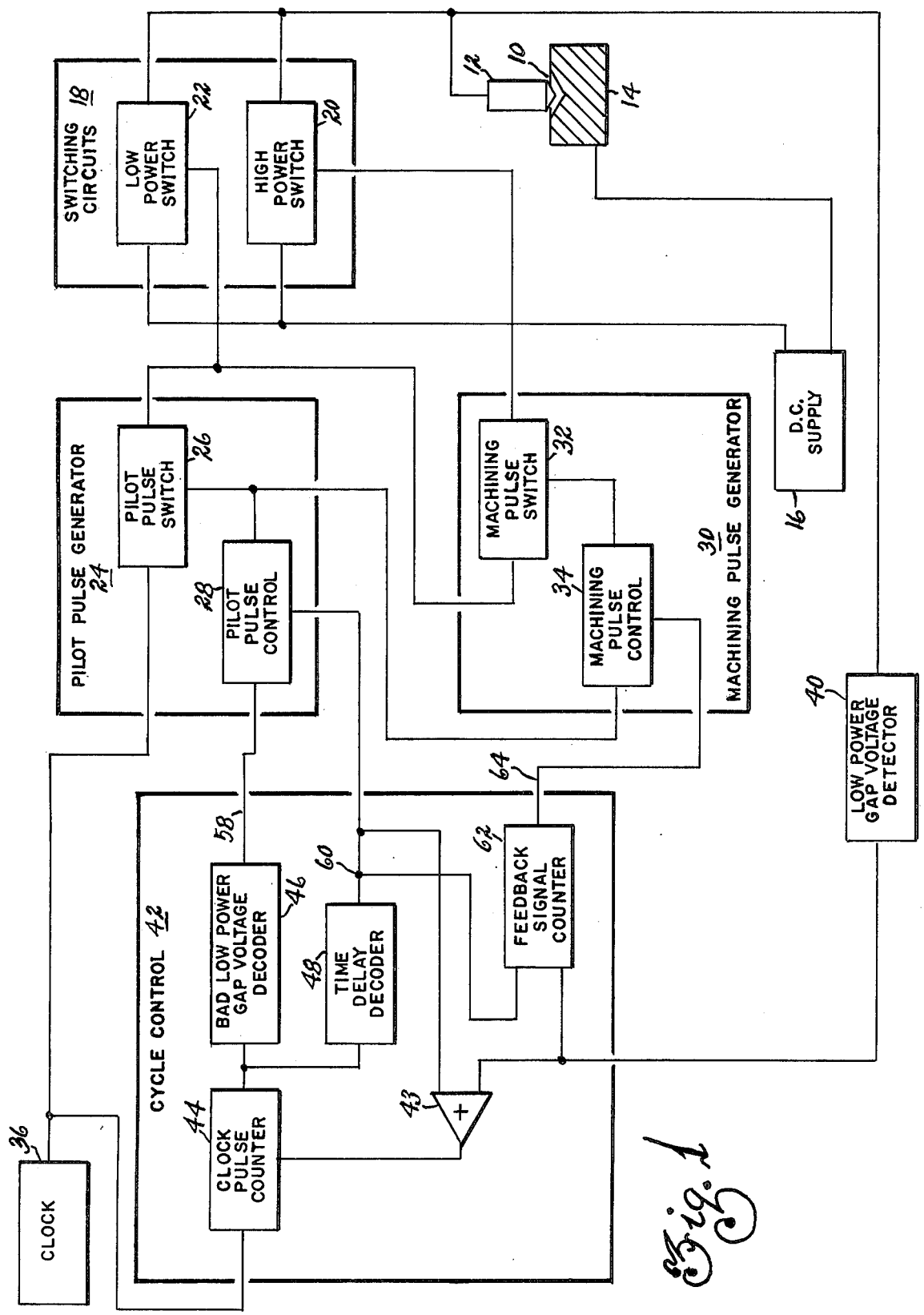
FIG. 1 is a detailed block diagram of the disclosed invention.

FIG. 1 is a detailed block diagram of the disclosed invention. A machining gap 10 is formed in a dielectric medium (not shown) between an electrically conductive tool 12 and a workpiece 14. Normally, with each machining pulse produced by the power supply, an electrical discharge is created across the machining gap causing a volume of metal to be melted from the workpiece which is washed away from the gap by the dielectric flow. Connected across the machining gap is a direct current supply 16. A power switching circuit 18 is responsive to the direct current supply 16 for supplying pulses to the machining gap. The switching circuit 18 is comprised of a high power switching circuit 20 and a low power switching circuit 22. The high power switching circuit is of a design well known in the art, and the low power switching circuit is identical to the high power switching circuit with the exception that a high value limiting resistor is used. Both switching circuits are responsive to the same direct current source. However, because of the limiting resistor, the low power switching circuit 22 will produce a low power pulse across the machining gap thereby normally producing a low power discharge. Whereas, the high power switching circuit 20 will produce a machining pulse across the gap thereby normally producing a machining discharge. In the disclosed invention, a voltage signal across the machining gap in response to a low power pulse is detected and used to control the operation of the power supply.

In addition to being connected to the direct current source 16, the low power switching circuit 22 is responsive to a pilot pulse generator 24 which is comprised of a pilot pulse switch 26 under the control of a pilot pulse control circuit 28. Similarly, the high power switching circuit 20 is controlled by a machining pulse generator circuit 30 which is comprised of a machining pulse switch 32 under the control of a machining pulse control circuit 34.

Under normal operating conditions, a source of clock pulses 36 operates the pilot pulse switch 26 to generate the low power discharges across the machining gap. The machining pulse switch 32 is responsive to the trailing edge of a pilot pulse for initiating a machining pulse thereby generating a machining discharge across the machining gap. The detector 40 produces a feedback signal in response to a good low power gap voltage signal, i.e. a gap voltage signal equal to or exceeding a predetermined level. A cycle control 42 is responsive to the feedback signals and the clock pulses for producing signals to the pilot pulse control 28 and machining pulse control 34 which under certain conditions will inhibit the operation of the pilot pulse switch 26 and machining pulse switch 32.

Within the cycle control 42, a clock pulse counter 44 is operative to count the number of clock pulses; however, said counter is reset by each feedback signal, i.e. each good low power gap voltage signal. Therefore, the clock pulse counter 44 will not be reset when there is no feedback signal, i.e. when a low power pulse produces a gap voltage signal less than the predetermined level. In effect, the clock pulse counter 44 counts the number of consecutive bad low power gap voltage signals which occur. Responsive to the clock pulse counter is a bad low power gap voltage signal decoder 46 and a time delay decoder 48.

The bad low power gap voltage signal decoder will produce an output signal on output line 58 in response to counting a first predetermined number of clock pulses generating corresponding bad low power gap voltage signals. This output signal passes to the pilot pulse control 28. The pilot pulse control produces an output signal which is operative to inhibit the pilot pulse switch 26 and energize the machining pulse control 34. The machining pulse control 34 produces an output signal to inhibit the operation of the machining pulse switch 32. Consequently, after the first predetermined number of clock pulses have been detected, the machining process is terminated; and the clock pulse counter 44 will continue to count. After a predetermined period of time as defined by further clock pulses and detected by the time delay decoder 48, an output signal is produced on the line 60. The output signal is operative to reset the pilot pulse control 28 which removes the inhibit from the pilot pulse switch 26, and low power pulses only are applied to the machining gap thereby generating further low power gap voltage signals. The output signal on line 60 is also connected to a feedback signal counter 62 which is operative to count the number of consecutive feedback signals generated by the low power gap voltage detector 40. After a predetermined number of consecutive feedback signals have been counted, the feedback signal counter 62 produces a signal on line 64 which resets the machining pulse control 34 thereby removing the inhibit from the machining pulse switch 32. Consequently, machining pulses are then reapplied to the machining gap in the normal manner.

Figure 2A:
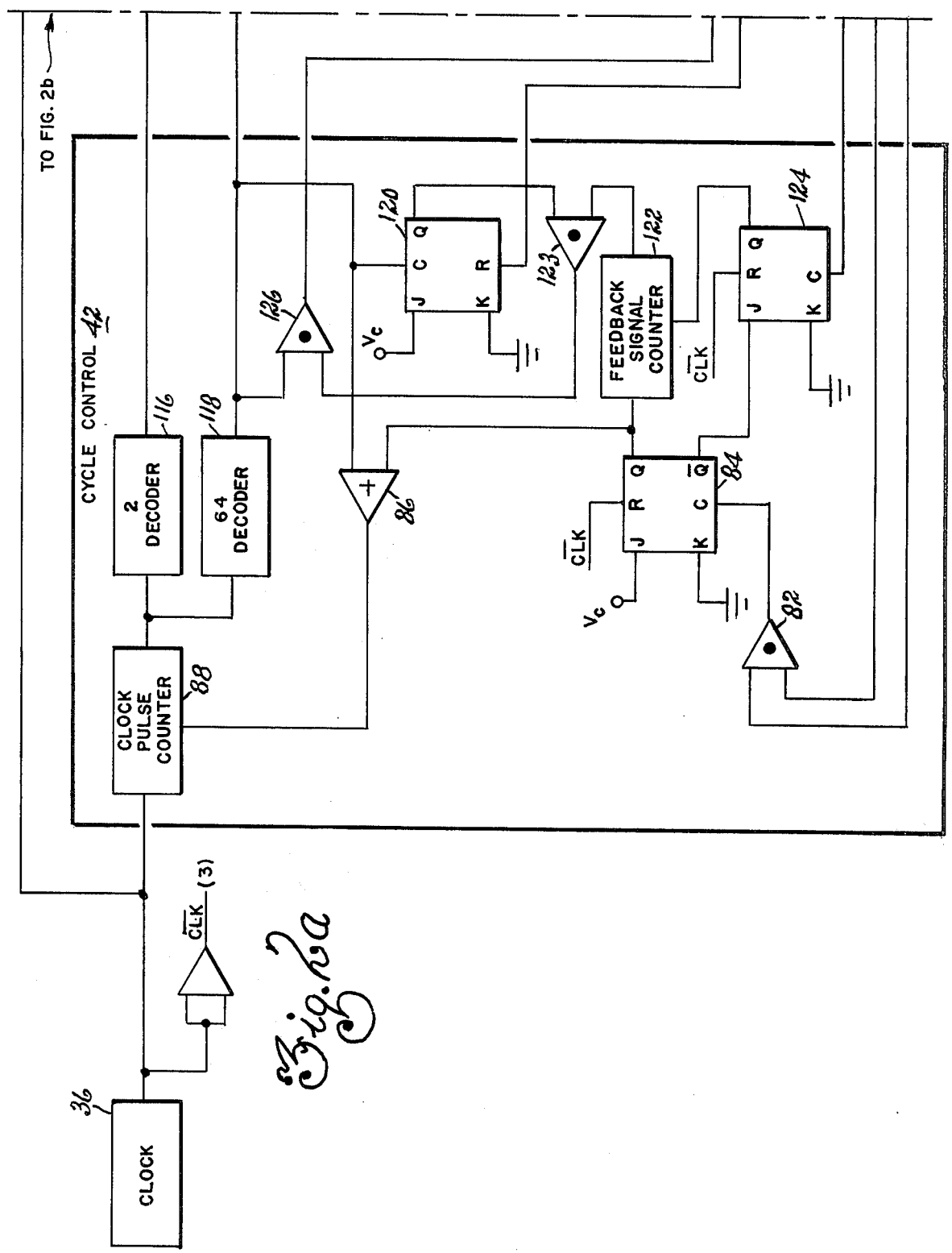
FIGS. 2a and 2b when joined along the indicated junction line illustrate a detailed schematic diagram of the disclosed invention.
Figure 2B:
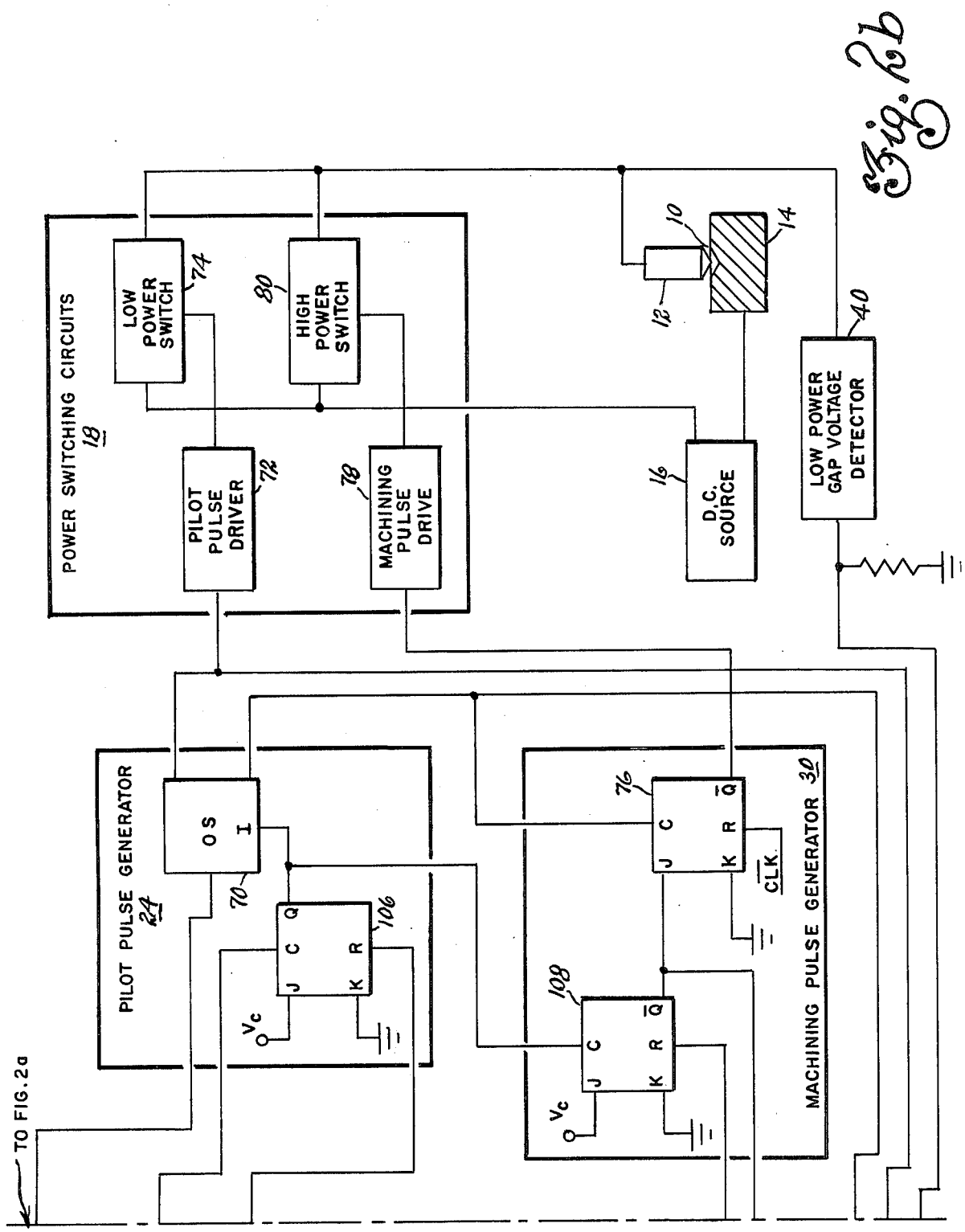

FIGS. 2a and 2b when joined along the indicated junction line illustrate a detailed schematic diagram of the disclosed invention. Under normal operating conditions, the clock 36 produces clock pulses to a monostable multivibrator 70 within the pilot pulse generator 24. The monostable multivibrator 70 operates as a pilot pulse switch and produces an output signal to a pilot pulse driver 72 within the power switching circuit 18. The pilot pulse driver 72 activates a low power switch 74 for producing a low power pulse across the machining gap. The multivibrator 70 is operative to clock a flip flop 76 within the machining pulse generator 30. The flip flop 76 operates as a machining pulse switch and produces an output signal to a machining pulse driver 78 which operates a high power switch 80 thereby producing a machining pulse across the machining gap.

A low power gap voltage detector 40 produces a feedback signal in response to a voltage signal across the gap during a low power pulse exceeding a predetermined magnitude. For example, when machining metal on metal, a typical voltage signal level may be 20 volts. Therefore, the detector may be designed to produce a feedback signal in response to any gap voltage signal magnitude in excess of 16 volts. The detector may also be designed to accomodate machining operations using graphite tooling. Such voltage detectors are known in the art and therefore, will not be disclosed in further detail at this time. The feedback signal from the voltage detector 40 represents one input to an AND gate 82. The other input to the AND gate 82 is an output from the multivibrator 70. This output provides a sampling window during which the feedback signal may be sampled by the flip flop 84 in the cycle control 42. Upon the occurrence of a feedback signal within the sampling window, the flip flop 84 is clocked to produce an output to the gate 86 which has an output connected to the reset input of the clock pulse counter 88.

FIG. 3 is a synchrogram of various signals generated within the power supply. The clock pulses are shown by the curve 90. On the leading edge of the clock pulse, the multivibrator 70 produces a pilot pulse as indicated by the curve 92. This pulse is applied to the machining gap through the low power switch 74; and the low power gap voltage detector produces an output as illustrated by the curve 94 in response to a good gap voltage signal. This voltage signal is detected and stored by the flip flop 84 as represented by the curve 96. A machining pulse as shown by curve 98 is produced by the flip flop 76 in response to the trailing edge of the pilot pulse shown in curve 92. It should be noted that the ratio of the ON time of the machining pulse to the pilot pulse is not shown to scale. Typically, the machining pulse ON time may be varied from a time period shorter than the pilot pulse to a time period orders of magnitude longer than the pilot pulse.

Returning to FIG. 2a, in response to the absence of feedback signals from the low power gap voltage detector 40, the flip flop 84 will not reset the clock pulse counter 88. Therefore, with each continuous faulty low power gap voltage signal, the clock pulse counter 88 will increment one count with each clock pulse. After two clock pulses have been counted, the decoder 116 will produce an output signal to clock the flip flop 106. The flip flop 106 operates as a pilot pulse control and operates to inhibit the monostable multivibrator 70 thereby terminating the generation of pilot pulses. Further, the output signal from flip flop 106 will clock the flip flop 108. This flip flop operates as a machining pulse control and will produce an output inhibiting the operation of the flip flop 76 thereby terminating the generation of machining pulses. The clock pulse counter 88 will continue to count the clock pulses; and after a predetermined period of time as determined by the decoder 118, an output signal will be produced which is operative to reset the flip flop 106 thereby removing the inhibit from the multivibrator 70. Consequently, pilot pulses are generated, and low power pulses are reapplied to the machining gap. The output from the decoder 118 is also operative to clock the flip flop 120. The output of flip flop 120 sets one input of an AND gate 123. Finally, the output of decoder 118 is operative to reset clock pulse counter 88. With only low power pulses being applied to the gap, the low power gap voltage detector is responsive thereto to produce feedback signals in response to good low power gap voltage signals. If the low power gap voltage signals are below the predetermined level, the clock pulse counter will again begin to accumulate clock pulses until the decoder 116 produces an output signal which inhibits the application of low power pulses. The low power pulses are inhibited for a period of time determined by the decoder 118 and then reapplied to the gap. If the gap conditions have cleared to the point where good low power gap voltage signals may occur, the flip flop 84 is set in its standard manner; and it provides an input to a feedback signal counter 122.

The feedback signal counter 122 is operative to detect a predetermined number of consecutive feedback signals. The absence of only a single feedback signal will cause the flip flop 124 to apply a reset signal to the counter 122. If the number of absent feedback signals is not equal to the number decoded by the decoder 116, the process will not time delay as determined by decoder 118, but will only cause the feedback signal counter to begin counting from its reset state. After the predetermined number of feedback signals has been counted, the feedback signal counter 122 produces an output signal to an input of the AND gate 123. An output from the AND gate 123 is transmitted to an input of AND gate 126 which causes an output signal to reset the flip flop 108. Consequently, machining pulses are again generated, and high power pulses are again applied across the machining gap.

As will be appreciated by those who are skilled in the art, many modern power supplies have substantially broad frequency ranges. It is common practice to divide the total frequency range into a small number of selectable frequency ranges. Although the monostable multivibrator 70 which generates the pilot pulses is shown as producing a constant duration signal, it is well within the skill of one in the art to cause a frequency range selector switch to connect external capacitors to the multivibrator 70. Therefore, the duration of the pilot pulse will vary as a function of the selected frequency. It should further be noted at this point that the exact number of clock pulses detected by the decoder 118 is not a limitation on the claimed invention. The decoded number may vary with a user's machining philosophy or a particular application. Further, the decoder 118 may be coordinated with the operation of the ON and/or OFF time controls in the power supply. In this situation, the number of clock pulses detected by the decoder will change as a function of the period of the clock pulses.

FIG. 4 contains an illustration of the low power pulse and high power pulse patterns. It should be noted again that the high power pulses and low power pulses are shown out-of-scale for purposes of illustration.

First, in FIG. 4, a good low power gap voltage signal 144 and good machining discharge 146 are illustrated. The detection level is defined by the line 143. Next, a bad low power gap voltage signal is shown at 148. In accordance with the preferred embodiment, after the second bad low power gap voltage signal shown at 150 occurs, the generation of low power pulses and high power pulses is terminated for a period of time indicated at 152. In the preferred embodiment this period of time is 62 clock counts or 64 clock pulses after the occurrence of the first bad low power gap voltage signal. Thereafter, the pilot pulses are again generated to produce low power pulses across the machining gap. Two good low power gap voltage signals are shown at 154 and 156. However, a bad low power gap voltage signal is shown at 158. This causes a reset to be applied to the feedback signal counter 122, but does not produce an output signal from the decoder 116. Consequently, with the next good low power gap voltage signal 160, the counter 88 is reset. However, two consecutive bad low power gap voltage signals are shown at 162 and 164. These two low power gap voltage signals are sufficient to produce an output signal from the decoder 116 which is operative to terminate the application of low power pulses for the period of time 166 as defined by the decoder 118.

After the predetermined period of time, the low power pulses are again applied to the gap to create further low power gap voltage signals. After a predetermined number of good low power gap voltage signals occur as indicated by the discharges 168 and 170 and as measured by the feedback signal counter 122, the high power pulses are again applied to the gap to produce machining discharges thereacross. This is indicated by a good low power gap voltage signal 172 and an associated machining discharge 174.

While the invention has been illustrated in some detail according to the preferred embodiments shown in the accompanying drawings and while the preferred illustrated embodiments have been described in some detail, there is no intention to limit the invention to such detail. On the contrary, it is intended to cover all modifications, alterations and equivalents falling with the spirit and scope of the appended claims.

What is claimed is:

1. An EDM power supply comprised in part of a source of clock pulses defining ON and OFF times and power switching circuits being connected to a DC source and responsive to the clock pulses for producing during the ON times low power pulses and high power pulses across a machining gap in response to pilot pulses and machining pulses respectively, wherein the improvement comprises:
   a. means responsive to each of the clock pulses and connected to the switching circuits for providing a pilot pulse in response to the leading edge of the ON time of the each of said clock pulses;
   b. means connected to the providing means for inhibiting the operation of the providing means;
   c. switching means responsive to the providing means and connected to the switching circuits for producing a machining pulse in response to the trailing edge of each of the pilot pulses;
   d. means responsive to the inhibiting means and connected to the switching means for terminating the operation of said switching means;
   e. means responsive to the clock pulses and the low power pulses for counting a first number of consecutive low power pulses producing gap voltage signal having a magnitude below a predetermined level;
   f. means responsive to the counting means and connected to the inhibiting means for activating the inhibiting means in response to the first number of consecutive low power pulses thereby terminating the generation of the pilot pulses and the machining pulses;
   g. means responsive to the counting means and connected to the inhibiting means for deactivating the inhibiting means after a predetermined period of time thereby allowing the generation of only pilot pulses to commence; and h. means responsive to the low power pulses and the predetermined period of time and connected to the terminating means for deactivating the terminating means after the predetermined period of time in response to the occurrence of a second number of consecutive low power pulses producing a gap voltage signal having a magnitude equal to or exceeding the predetermined level thereby allowing the generation of the machining pulses to commence.

2. An EDM process for removing metal during the ON time of a clock pulse, said process having the steps of initiating a spark discharge across a machining gap, melting a volume of metal and terminating the spark discharge after a predetermined period of time commensurate with a predetermined energy level, the improvement comprising the steps of:

a. applying a low power pulse to the machining gap to produce a gap voltage signal in response to the leading edge of the ON time of a clock pulse;

b. applying a high power pulse to the machining gap in response to the trailing edge of the low power pulse;

c. iterating steps (a) and (b) in response to each of the clock pulses;

d. detecting a bad gap voltage signal having a magnitude less than a predetermined voltage level;

e. counting a first number of consecutive bad gap voltage signals;

f. terminating the application of low power pulses to the machining gap in response to counting the first number of consecutive bad gap voltage signals, whereby the application of high power pulses is also terminated;

g. commencing the application of only low power pulses after a predetermined period of time;

h. counting, in response to the application of only low power pulses, a second number of consecutive good gap voltage signals having a magnitude equal to or greater than the predetermined voltage level; and i. iterating steps (d) through (g) until detecting the second number of consecutive good gap voltage signals;

j. commencing the application of high power pulses in response to counting the second number of consecutive good gap voltage signals.

3. The process of claim 2, wherein the step of counting a second number of consecutive good gap voltage signals further comprises the steps of:

a. counting a third number of bad gap voltage signals less than the first number of bad gap voltage signals;

b. restarting the count of the second number of consecutive good gap voltage signals in response to the third number of bad gap voltage signals; and c. iterating steps (a) and (b) until the second number of consecutive good gap voltage signals has been counted.

* * * * *